United States Patent

[11] 3,611,415

[72] Inventor Alfred M. Nelson
Redondo Beach, Calif.

[21] Appl. No. 724,110

[22] Filed Apr. 25, 1968

[45] Patented Oct. 5, 1971

[73] Assignee The Magnavox Company
Ft. Wayne, Ind.

[54] FLATBED THERMOMAGNETIC FACSIMILE SYSTEM
19 Claims, 6 Drawing Figs.

[52] U.S. Cl. .................................................... 346/74 MT, 178/6.6 A, 179/100.2 CR

[51] Int. Cl. .................................................... G01d 15/12, H01v 3/04

[50] Field of Search ........................................ 346/74 M, 74 MP, 74 MT; 178/6.6 A; 179/100.2 CR

[56] References Cited

UNITED STATES PATENTS

| | | | |
|---|---|---|---|
| 3,512,168 | 5/1970 | Bate | 346/74 |
| 2,950,161 | 8/1960 | Rueger | 346/74 |
| 2,976,354 | 3/1961 | Banning et al. | 179/100.2 |
| 3,213,206 | 10/1965 | Zworykin et al. | 179/100.2 |
| 3,250,636 | 5/1966 | Wilferth | 346/74 |

*Primary Examiner*—Bernard Konick
*Assistant Examiner*—Gary M. Hoffman
*Attorney*—Smyth, Roston & Pavitt

ABSTRACT: A facsimile system is disclosed using transmitter and receiver, for transmitting a line for line-scanning raster facsimile signal to the receiver which controls a thermomagnetic process to obtain a magnetic latent image of the document to be duplicated. The latent image serves as storage element, as well as a printing platen using a magnetizable toner.

INVENTOR:
Alfred M. Nelson
By Smyth, Roston & Pavitt
ATTORNEYS

INVENTOR:
Alfred M. Nelson

By Smyth, Roston & Pavitt
ATTORNEYS

FLATBED THERMOMAGNETIC FACSIMILE SYSTEM

The present invention relates to a facsimile system and more particularly to a system in which one or more duplicates of a document, or the like, can be printed at a location, remote from the place of the document, using transmission facilities for the transmission of signals representing facsimile information.

Known facsimile systems usually employ a transmitter which provides electrical signals constituting facsimile scanning signals and representing the visible contrast of a document in the form of a line or raster scan signal. The facsimile signal is transmitted to a receiver station at a remote location and is used therein to directly control a stencil, or the like, usually operating with and cooperating with special paper for producing optical contrast so as to obtain a duplicate of the document scanned at the transmitter station. It is inherent in the known type of systems that a new scanning signal, i.e., a signal train representing a line-for-line scan of the document to be duplicated must be produced for each duplicate. Also, the duplicate copy is produced immediately at the time of transmission.

It is, of course, possible to use a tape recorder, for example, at the receiver station, and instead of directly controlling the stencil, the facsimile signal is stored as received on magnetic tape. Storing the facsimile signal in this manner permits production of the duplicate, when desired, i.e., independently from the time of transmission of the facsimile signal. Also, a plurality of duplicates can be produced by reproducing the recorded facsimile signal repeatedly, thus obviating the necessity of repeated transmission. On the other hand, such a system has the disadvantage that it requires recorder-reproducer equipment in addition to the facsimile equipment. Furthermore, the known facsimile systems usually require special paper, such as pressure-sensitive paper, or the like, cooperating with the stencil in order to produce incremental contrasting areas which, in total will make up the duplicate of the document. This requirement is independent from the fact, whether or not the facsimile signal is recorded before it is being utilized for controlling the duplicating process proper.

The facsimile system in accordance with the present invention is constructed so that the printout of a duplicate is possible on regular paper; the printout process inherently includes a storage of the facsimile signal in that the facsimile signal as received is used directly to prepare a particular printing platen. This platen is erasable but receives as a recording a latent image of the document permitting immediate, as well as deferred, printout and permitting also a repeated printout for providing a plurality of duplicates.

The facsimile system, in accordance with the present invention, therefore, includes a transmitter in which a pickup transducer provides a line-for-line raster scan signal representing the contrast of the document as a baseband, facsimile signal. This signal is preferably used as a modulator signal to frequency modulate a carrier frequency signal. The resulting frequency-modulated carrier signal is used to control a transmitter coupler which is coupled to a suitable facsimile transmission facility. The signal could be transmitted by conventional radiofrequency, microwave or direct line method.

The facsimile signal is received at a remote station, and if the transmission facility is a cable, a wire, or the like, the receiver is provided with a suitable coupler which responds to the transmitted signal and provides a suitable amplification thereof. If the transmitted signal is a carrier-modulated signal, a detector signal is provided in order to restore the line scan, baseband signal itself. The baseband facsimile signal is used to control a thermomagnetic recording process. Particularly the signal controls the radiation intensity of a flying spot scanner cooperating with a magnetic surface which can interact with the radiation beam in a manner affecting its magnetic properties. In particular, the radiation beam is used to selectively erase a premagnetization previously imparted upon the magnetic storage carrier surface. The premagnetization may be a uniform one or may include a regular pole-pattern. The radiation beam is used to render progressively selected portions of that surface temporarily paramagnetic, thereby destroying the premagnetization. As the paramagnetic surface portions revert to the ferromagnetic state, a magnetization, different from the one as originally imparted upon the surface carrier, is provided to the carrier. As a consequence, the magnetic storage carrier obtains distributed magnetic poles with magnetic axes oriented in different directions or transverse to the surface of the magnetic layer constituting the storage carrier. The density and intensity of these poles is a function of the light intensity used (1) to erase the premagnetization and (2) to control the extent of the substitute magnetization; that function represents the facsimile signal.

The magnetic poles distributed at variable density and intensity over the surface of the storage carrier constitute a latent image of the document; they provide spatially variable attraction to a magnetic toner when applied to the surface. The application of sufficiently finely divided magnetic toner particles, such as a ferromagnetic powder precedes the printout proper. It can be deferred if an immediate printout is not desired. The carrier with magnetic toner particles applied is then used as a platen and brought into juxtaposition with a sheet of ordinary paper and a contrast producing printout is obtained. The contrasts follow the contrast of the original document at a resolution determined by the scanning raster.

As the facsimile signal controlling the radiation beam inscribes a latent line-for-line magnetic image of the document on the magnetic storage carrier, it is not erased by the printing process; instead the latent image can be used as printing platen at any time after the latent magnetic image has been produced, and, within reasonable limits, repeatedly to produce more than one printout of that image. Therefore, the thermomagnetic recording process as a duplicating process includes an inherent storage of the facsimile signal as received and as a latent magnetic image of the document to be duplicated; the facsimile signal is not used to control directly an optical contrast-producing process at the time the facsimile signal is received.

It is a significant feature of the present invention, that both image pickup and image reproduction involve radiant energy such as a focused beam of light. Since often facsimile units are provided with both, transmission and receiving facilities, the same beam and scanner can be used for pickup, when the particular station or unit operates as facsimile transmitter, while beam and scanner provide thermomagnetic recording when the unit operates as facsimile receiver. In one mode, the document to be duplicated is placed in the range of scanner and beam; in the other mode a magnetizable sheet or the like is placed in the range of the scanner. It may become necessary to adjust the intensity of the beam in the different modes in order to obtain optimum response in both modes.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
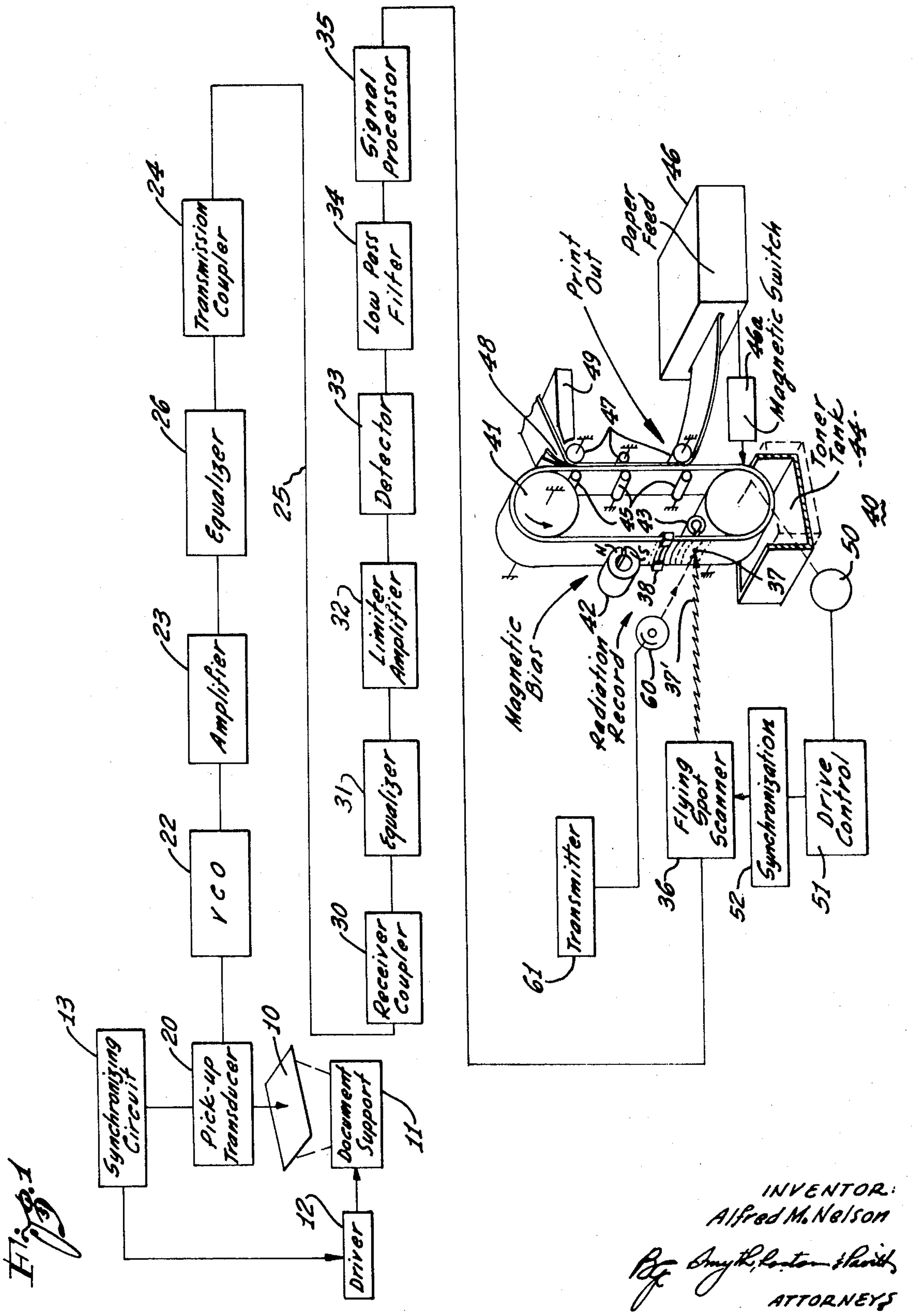
FIG. 1 illustrates schematically the layout of a facsimile transmission system in accordance with the present invention.

Referring now to the drawings in greater detail. In FIG. 1 there is illustrated a facsimile transmitter-receiver system constructed in accordance with the principles of the present invention. The purpose of this system is the reproduction of a duplicate of document 10 at a location remote from the present place of the document. The scanning of the original document 10 is accomplished by a pickup transducer 20 mounted and positioned in relation to a document support 11, so that upon scanning the document 10 a line-for-line raster scan signal is developed by the pickup transducer 20. Transducer 20, in particular, provides a sharply focused light spot, and the intensity of the reflection thereof is photoelectrically observed.

It is, in principle, unimportant whether the scanning raster is produced in that the pickup transducer 20 moves relative to the document 10, or whether the support 11 together with document 10 is moved in relation to the pickup transducer 20, or both. In the preferred mode, a combined motion will be employed; the pickup transducer 20 provides movement of the scanning light spot (flying spot scan) corresponding to scanning of an individual line. Transducer 20 scans a line on document 10 at a particular repetition rate, so that, for example, after a fast retrace the scanning spot will scan the same line again unless document 10 has moved in the meantime relative to the transducer 20 as a whole. In order to obtain a two dimensional scanning raster, transducer and document advance relative to each other and transverse to the line scan. Preferably, document support 11 is driven by a driver 12 transverse to the direction of scanning by the transducer 20. It is convenient to speak of the width of the document or document bed as being determined by the direction of extension of the lines of the raster line scan process. The direction perpendicular to the lines then defines the length of the document or the document bed accordingly.

For reasons of facsimile transmitter-receiver synchronization, the scanning process may be controlled in synchronism with the usual powerline frequency of 60 c.p.s. An appropriate sync-circuit 13 is coupled to the local powerline and controls both, the scanning device of transducer 20 and the driver 12. The document 10 is advanced by the driver during each line scan cycle over a distance about equal to the size of the scanning spot in a direction transverse to its motion, which represents the line width of the flying spot scanner.

The electrical signals produced by the pickup transducer 20 in response to the written matter or other contrast producing, printed or written information on document 10 have characteristics in form of amplitude variations in accordance with the intensity of the contrast variations monitored by the pickup transducer 20 along the run of its flying spot. These signals will, in the following, be called baseband signals and may serve as modulator signals for a FM modulator. For example, a voltage-controlled oscillator (VCO) 22 is connected to transducer 20 and provides an output signal at a particular frequency in dependence upon the amplitude of the signal as applied to its input at any instant. The VCO output frequencies are higher than any significant frequency component of the baseband signal.

A first amplitude of the baseband signal represents maximum detected brightness corresponding to a "white" document portion, a second amplitude of the baseband signal represents minimum detected brightness corresponding to dark or "black" portions of the document. The full range available for the system will, of course, not always be used. The effective contrast range depends on the whiteness of the document and the blackness of the print. The values of the first and second amplitudes will be apart, usually, by one or several orders of magnitude. The frequencies of the signals produced by VCO 22 in response to the first and second amplitudes establish the facsimile carrier band.

The signal of variable frequency within the carrier band and as provided by the voltage-controlled oscillator 22 is fed to an output amplifier 23 which, in turn, feeds its output to a transmitter-coupler 24. Transmitter 24 with coupler provides the facsimile signal to be transmitted to a transmission facility 25. The transmission facility 25 may, for example, be a regular telephone transmission facility, and the transmitter 24 has a coupler unit which couples the FM-modulated facsimile signal to a telephone set. Details of such a connection are, for example, shown in U.S. Pat. application Ser. No. 176,248, filed Feb. 28, 1962, now abandoned in the name of Glenn A Reese and Paul J. Crane, inventors, and being assignors to the assignee of the present application, and also in the application, Ser. No. 458,954, filed May 26, 1965, now abandoned in the names of Rex J. Crookshanks and Glenn A Reese, inventors and also assignors to the assignee of the present application. The circuit connection between amplifier 23 and transmitter coupler 24 include an equalizer 26 in order to compensate distortions of the signals in transmission facility 25 to which transmitter 24 is coupled.

The FM facsimile signal is passed through the transmission facility 25 to a receiver unit 30 coupled at that time to the facility 25 for receiving the FM facsimile signal. The receiver coupler 30 may also be a telephone set, as described in the above-described patent applications. The output signal of receiver coupler 30 is, possibly, passed to an equalizer 31 also for compensating distortions which may have occurred and to supplement operation of equalizer 26 on the transmitter side. The modulated carrier signal is passed next to a limiter amplifier 32 which serves to reduce noise and signals other than the signals of interest, thus basically eliminating or tending to eliminate most or all signals outside of the carrier band. Thereafter, the signal is demodulated by a demodulator unit which includes a detector 33, separating the baseband signal, as defined above, from the carrier. The baseband facsimile signal having relatively low frequency (down to DC) is fed into a low-pass filter 34 passing only the low-frequency baseband signal accordingly. The output of filter 34 is fed to a signal processor 35, the function of which will be described in some greater detail below.

The signal as processed by processor 35 is passed to a flying spot scanner 36. Scanner 36 produces a light beam 37' focused to a spot 37. The output signal of processor 35 controls the intensity of the light beam 37'. For example, scanner 36 includes a controllable, high-speed diaphragm, opened to an extent as determined by the amplitude of the processed facsimile baseband signal. The intensity of spot 37 varies accordingly. This light beam 37' is, so to speak, an optical stencil for preparing a "platen" in a printing unit 40 to be described in the following. The object of the system in accordance with this invention is to print a duplicate of the document 10 whereby, in particular, the system is devised to permit printing of more than one copy without requiring repeated transmission of the facsimile signal. Therefore, the invention includes a means for storing the facsimile signal which, in turn, permits a printout at a later time, if required or desired.

The principal component of the printing unit 40 is a magnetic storage carrier such as an endless belt 41 having a rather thin magnetizable layer on a deformable backing member. The magnetizable layer of this belt is preferably of the type having a low Curie point. A layer in which chromium dioxide particles are used is the preferred mode of practicing the invention. This endless belt 41 is driven by a motor 50. The several system components and elements placed along the belt and along which any portion of the endless belt passes in a particular sequence for obtaining a complete facsimile printout cycle will be described next in that sequence.

The belt 41 width is at least as wide as the duplicate document to be produced in the direction of scanning; a 1:1 copy ratio is assumed. This, however, is not essential and different ratios can readily be obtained. A permanent magnet 42 extends across the width of the belt 41 for magnetizing the belt longitudinally and as indicated by the polarity of the pole shoes of magnet 42. As illustrated, magnet 42 is preferably a permanent magnet, but it could also e an electromagnetically energizable transducer. In either case, magnet 42 provides magnetic bias to the belt. The magnetic field as imparted upon progressive portions of belt 41 by magnet 42 must be as uniform as possible and, preferably, at saturation level in the particular chosen direction of longitudinal magnetization.

Next, the belt enters the range of the focused light beam 37'. As stated, the light beam originates in a flying spot scanner 36 which is oriented to cause spot 37 to move across the belt, i.e., transverse to the motion of the belt itself. Due to fast retrace and/or repetition of motion of the flying spot scanner, spot 37 travels across the belt in parallel lines. The scanning rate, i.e., the repetition rate of scanning and/or retrace of the spot 37 as controlled by scanner 30, must be precisely the same as the scanning rate of the transducer 20 on the transmitter station.

If, for example, pickup transducer 20, particularly the scanning portion thereof, and flying spot scanner 36 are both driven in synchronism with the powerline frequencies, synchronous operation as between transmitter and receiver stations is automatically obtained, after the two scanners have phase locked. Initial phase locking between the pickup-scan and the reproduce-scan is obtained conventionally, in that, for example, prior to transmission of the facsimile signal, synchronizing pulses are transmitted from the facsimile transmitter system to the scanner 36 on the receiver side so that the scanners 20 and 36 synchronize and remain phase locked to the powerline frequency during the facsimile transmission operation.

The focused light spot 37 passes, therefore, across neighboring strips on the belt 41 due to the continuous advance of belt 41 as driven by motor 51. For reasons of simplification, it shall be assumed that the duplicate is to be provided at a 1 to 1 image ratio, so that the advance of belt 41 must be equal to the rate of advance of the document support 11 in the transmitter station; it will be recalled that document support 11 advances document 10 relative to the pickup transducer 20 perpendicular to the direction of scanning pickup scanning corresponding to the belt motion on the receiver side of the system. As illustrated somewhat schematically, motor 50 for driving belt 41 is under control of a circuit 51 of suitable design and a synchronizing network 52 is connected thereto in order to ensure synchronous operation of the flying spot scanner 36, on one hand, and of the belt drive as composed of the elements 50 and 51, on the other hand.

It will be appreciated that the belt must be driven at a speed equal to the length of the copy to be produced, divided by the number of scanning lines needed to cover the entire length thereof, times the repetition rate of the line-scan process in either station, so that in between sequential scans, as provided by the flying spot scanner 36, the belt is advanced for a distance equal to the desired center to center distance between neighboring scanning lines. Otherwise, longitudinal synchronization with the driver 12 on the transmitter side is not necessary due to the fact that the belt 41 has no defined boundaries outlining an area which must pass under scanner 36. Thus, as soon as scanners 20 and 36 have synchronized, facsimile transmission may commence.

If the focusing system in scanner 36 produces a very narrow beam, with a very small angle of divergence, very little image distortion if any will result from the fact that the focused spot 37 actually travels along an arc, while the surface of belt 41 is flat; provided this arc has a very large radius. On the other hand, guide elements 38 (FIGS. 2 and 6) may be provided, gripping the belt and bending it slightly in the range of scanner 36 so that the surface portion of belt in that range is curved corresponding to that curvature of the arc outlined by the focused spot at correct focusing distance at any instant.

Details of the interaction between the radiant energy and the magnetized layer on belt 41 will be described in greater detail below. Suffice it to say that as a result of heating of progressive spots on belt 41 by the focused scanning spot 37 at any instant, a particular portion of the magnetic layer on the belt and along the center of each scanning line as provided by flying spot 37 reaches the Curie point or even exceeds same, so that the magnetization as provided initially by the magnet 42 is erased in those portions of the magnetic layer on belt 41 so heated.

A second magnet 43 is provided having an effective transducer gap in alignment with the travel path of the flying spot 37, but being disposed on the other side of belt 41. Thus the spot 37 travels at any instant over (progressing) portions of belt 41 which, on the other side thereof are aligned with the gap of transducer 43. The transducer 43 may also be a permanent magnet, it may be constructed similarly as magnet 42 but providing to the belt 41 a weaker magnetization. Magnet 43 does not face the magnetic layer of belt 41 directly but only through the backing member thereof, so that the full field strength as existing across its gap and in close proximity thereof cannot be effective in the magnetic layer. In any event, the magnetization imparted by transducer 43 at any instant upon the magnetic layer of the belt has an intensity below room temperature coercivity and a longitudinal direction opposite to the magnetization as was imparted upon the magnetic layer by magnet 42.

The magnet 43 coacting with spot 37 will thus be able to magnetize only those portions of the magnetic layer on belt 41 which have been heated close to or above the Curie point. The spot 37 heats only a small spot of the magnetic layer at any instant and for a short period of time. The magnet 43, however, extends over the entire belt width, i.e., the length of a scanning line. The magnetizing gap of magnet 43 may even be wider than a single scanning line width (measured longitudinally at belt 41). Thus, any small portion of the magnetic layer which has been heated by flying spot 37 above the Curie point and which became paramagnetic will, as soon as the flying spot has receded, revert to the ferromagnetic state under the influence of the weak magnetic field as provided by the magnet 43. Therefore, any portion of the magnetic layer so affected will be remagnetized. If the magnetization is not too weak, i.e., not too much below room temperature coercivity, those portions of the magnetic layer will be magnetized at saturation after cooling, even though the field strength, as provided by the transducer 43, is insufficient at room temperature to permanently magnetize the magnetic layer of belt 41. Therefore, the magnet 43 will not affect those portions of the magnetic layer belt 41 which have not been heated above the Curie point; this relates to portions of the belt which extend, generally, in between neighboring scanning lines.

As any portion of the belt 41 thus treated leaves the range of scanner 36 and of transducer 43, a magnetization pattern, in the form of a variable-width line pattern, remains on belt 41 and it will be shown below that this is a latent image of the document. Assuming this to be the case, the belt 41 will then pass through a container or tank 44 which holds a powder comprising particles which are attached by a magnetic field. This may be ferromagnetic powder, such as an iron powder, or the like. Powder particles will adhere to the belt 41 in places and in accordance with the variable-width line pattern.

The belt 41, thus treated, and with ferromagnetic particles adhering on its surface, is then passed through the printout station proper. There are, for example, provided a plurality of pinch rollers 45 disposed on the inner side of the belt 41 for engagement therewith. A paper feed unit 46 cooperates with another set of rollers 47 to cause a sheet of paper to be brought in face-to-face contact with the portion of the belt 41 which carries the distributed magnetizable particles. A magnetically sensitive switch **46*a* is positioned to sense advance of the leading edge of the magnetic image on the belt. The belt 41 is normally uniformly magnetized by the magnet 42. After reception of a facsimile signal, there is a gradient on the belt, namely along the first scanning line. That gradient is sensed by switch 46*a* to trigger the paper feed 46 so as to feed a sheet of paper into engagement by the leading one of rollers 47. Coacting with belt 41 as well as with oppositely positioned rollers 45, rollers 47 reel the paper face-to-face contact with belt 41** through the printing station.

As rollers 45 and 47 cause the paper to be urged against belt 41 the magnetizable particles will adhere to the paper, and a printout is obtained. A guide 48 then separates the paper from the belt 41 and the rollers place the paper, for example, on a table 49, from which the duplicate of the document can be removed. A brush or a blower or both (not shown) may be suitably positioned between the separator 48 and magnet 42, to clean the surface of the belt. As the rotation of the belt continues, the strong field of magnet 42 destroys the magnetization pattern and provides again a uniform premagnetization so that the particular portion of the belt is ready for another printing cycle.

It is now an important aspect that subsequent printouts of the same latent image can be made, provided the magnet 42 is being removed or rendered ineffective, so that the image is not erased from the belt. In case magnet 42 is a permanent magnet, it should be removed physically, for example, pivoted out of its operating, close position to belt 41. If magnet 42 is an electromagnet, the current thereto must be turned off. Moreover, as the particular portion of belt 41 passes again through the range of scanner 36, it must be turned off, and the reception of further facsimile signals must be delayed until a portion of belt 41 passes through the range of scanner 36 which does not hold any latent image. In case all these conditions are present, the latent magnetic image remains on the belt 41 and passes again through the container 44, magnetizable powder particles will again adhere and another printout can be affected until the powder has demagnetized the belt to an extent to render further copying impractical.

Figures 2, 3, 4, 5, 6:
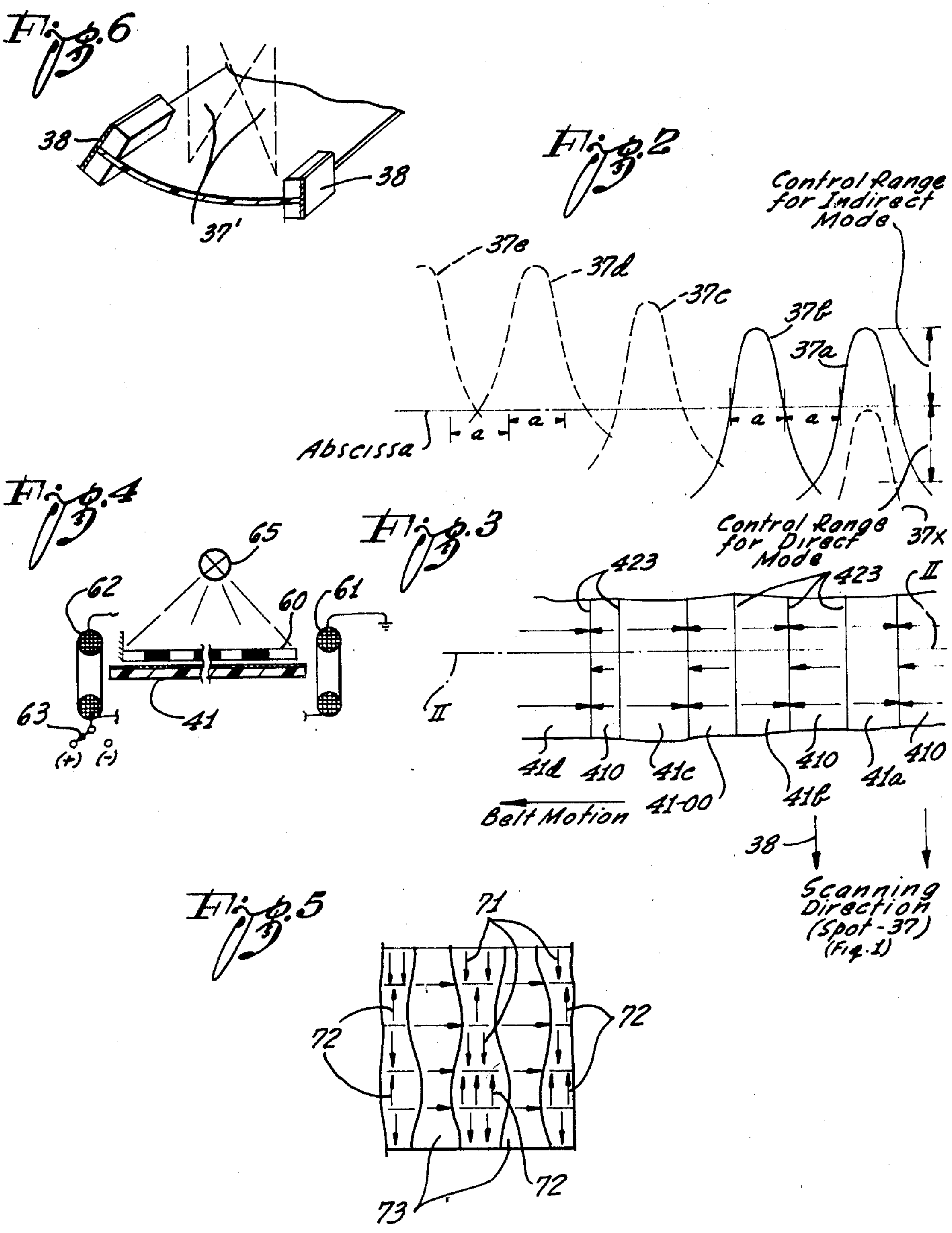
FIG. 2 is a plot of the energy distribution produced in a magnetic layer upon passage of a flying spot thereacross and in sequential lines perpendicular to the plane of the drawing.
FIG. 3 is a schematic plan view drawn in alignment with FIG. 2 and showing the resulting magnetization pattern imparted upon a magnetic layer.
FIG. 4 illustrates somewhat schematically a magnetic biasing station to be substituted for the one shown as one component in FIG. 1.
FIG. 5 shows schematically a magnetization pattern when a bias station as shown in FIG. 4 is being employed.
FIG. 6 constitutes an enlarged fragmentary perspective view of a portion of the apparatus shown in perspective in FIG. 1.

After having described the operation of the printing station 40 in principle, it shall now be explained that the device will, in fact, produce a faithful duplicate of the document. Turning specifically to FIG. 2, there is illustrated graph to be interpreted as follows. The ordinate (not shown) of the graph represents total radiation energy as imparted on the magnetic layer of belt 41 per unit area upon passage of light spot 37. The abscissa of FIG. 2 represents a linear dimension along the belt, particularly in direction of belt motion. The abscissa thus extends transverse to the direction of line scanning by spot 37, which in turn is transverse to the plane of the drawing of FIG. 2. Thus, FIG. 2 shows an energy distribution taken along a line II—II of the portion of the belt shown in top view in FIG. 3. The markers plotted equidistantly on the abscissa of FIG. 2 represent a scale value *a* on belt 41 chosen to be the half-distance value of the center-to-center distance 2*a* of the scanning line pattern forming the raster.

Without special filtering light spot 37 has a Gaussian distribution of intensity in every direction in any plane at right angles to the direction of the beam 37'. As the spot travels along a particular path on the belt it affects a narrow, line-shaped area of the magnetic layer thereof. That area extends transverse to the travel of the spot 37. The center of the spot 37 thus outlines the centerline of the line-shaped area of belt 41 thermally treated by the spot on its run. The line-shaped area of belt 41 thus affected receives and absorbs thermal energy as depicted, for example, in curve **37*a*. The point of maximum energy absorption (peak of trace 37*a*) coincides with the point over which the center of spot 37 passed. The particular intensity of the light beam having produced the particular intensity distribution 37*a*, taken in relation to the linear dimension of the abscissa in FIG. 2**, was such that the temperature of a strip of the magnetic layer having the width equal to the chosen unity *a* of the abscissa scale is raised above the Curie point. Thus, the energy intensities of trace **37*a*** having value exceeding the level as defined by the abscissa on the ordinate scale, raise the temperature of the respective incremental portion of the magnetic layer above the Curie point; lower energies do not suffice.

Trace **37*b* shows the distribution of energy absorbed in the magnetic layer of belt 41 when the spot 37 "writes" the next line, assuming the light intensity of the beam has not changed in the meantime or returned to the same value when passing the area considered. The thermal energies depicted with traces 37*a* and 37*b* are developed in the respective layer portions at different times. The resulting peak temperatures are not maintained, thus they do not add. The thermal energy developed in any area on the belt decays rapidly after the "-heating source," spot 37**, recedes, so that peak temperatures are actually effective during heating only. The thermal decay time (being in the microsecond range and shorter) is much shorter than the line-for-line repetition rate of the facsimile process.

The peak-to-peak distance of the two traces **37*a* and 37*b*** is equal to the center-to-center distance 2*a* of the line raster inscribed by dot 37. Thus, for such a chosen light intensity of beam 37', spot 37 inscribes a line pattern defined as follows: strips of equal width wherein the Curie point has been excluded alternate with strips in which the Curie temperature has not been exceeded. The width of these strips is equal to half the center-to-center line distance of the scanning raster. As will be understood shortly, the light intensity of the spot producing thermal distributions represented by traces **37*a* and 37*b*** correspond to a facsimile signal representing a dark document portion.

The distance 2*a* from center to center of neighboring lines is a geometric parameter determined by the type of scanning raster used and is thus ultimately determined by the number of scanning lines employed at the transmitter side. The center-to-center distance of the peak **37*a* and 37*b*** is thus a given parameter for the normal 1:1 reproduction scale. Therefore, the intensity distribution for the light beam must be adjusted to obtain a light intensity distribution in which, in fact, the diameter of the light spot at a level sufficient to raise the respectively affected portion to or above the Curie point is just equal to one-half of that particular center-to-center distance between neighboring lines for a light intensity equivalent to a dark image area.

FIG. 3 shows a top view of that particular portion of belt 41 and plotted in alignment with FIG. 2. As the light beam 37' propagates in a direction denoted with reference character 38 in FIG. 3 strips such as **41*a* and 41*b* are rendered paramagnetic. By operation of the transducer 43 a magnetization is imparted upon the strips, as indicated by the arrows therein. Alternating therewith are strips 410 of equal width in which the magnetization has the opposite direction. This is the remaining magnetization which was initially imparted upon the belt by the magnet 42**, and which was not affected by the thermal process included by the light spot.

Therefore, the strips **41*a* and 41*b* are remagnetized by cooperation of beam 37' and of transducer 43, and they each are each bounded by areas in which the initial longitudinal magnetization remains. It follows that a pattern of equidistantly spaced boundary lines 423 is set up along which the longitudinal magnetization in the belt changes direction. Hence, along the boundaries 423 magnetic poles are set up, the axes of which are oriented normal to the plane of the magnetic layer of belt 41, and from which or to which pass magnetic field lines, perpendicular to the plane of the planar extension of the belt 41. The pole lines 423** thus produced have alternating polarity, but either of them defines line-shaped centers of attraction for magnetizable particles.

For the given raster pattern outlined by a spot producing intensities of absorbed energy as depicted by traces **37*a* and 37*b*, each pole line is at maximum distance possible from both neighboring pole lines of opposite polarity, so that either pole can develop maximum pole strength. If the attracted particles are sufficiently coarse, and if the magnetizable layer is sufficiently strong, then the area of belt 41, thus affected, will macroscopically speaking, attract uniformly magnetic toner particles. In the final printout a uniformly dark area will be produced. Thus a light intensity of beam 37' causing, along the direction of scanning, strips of half the line distance to become temporarily paramagnetic results in a dark printout area. Therefore, the flying spot scanner 36** must be adjusted so as to produce such a light intensity for a facsimile signal equivalent to a black image portion (second amplitude value, supra).

A grey tone in the document and, therefore, of the facsimile signal causes the light intensity of the beam 37' to increase. For example, along the third one of the scanning lines illustrated in FIG. 2, such a grey tone is represented by the trace 37c. A light beam of stronger intensity than the one producing traces 37a or 37b thus raises the level of the thermal energy developed in the magnetic layer of belt 41 after passage of spot 37. Accordingly, the strip which becomes paramagnetic along that scanning line becomes wider. In alignment with trace 37c of FIG. 2 there is shown in FIG. 3 the correspondingly wider strip 41c, now separated from the strip 41b by a relatively narrow strip 41–00 of retained, original magnetization. As a consequence, the two pole lines bounding the narrow strip 41–00 are rather close and their pole strength is weakened. The relatively wide strip 41c separates pairs of pole for a wider distance and offers along its middle an area of no attraction towards the surface of the magnetic layer of belt 41. At least this area of no attraction is larger than any corresponding area along the middle of the strips 41a or 41b. The area on belt 41 affected in that manner will, therefore, cause less particles of the toner material to be attracted leaving particularly a small, strip-shaped portion along the center of strip 41c completely free from toner particles. As a consequence, after printout, less than maximum amount of the toner particles will be placed on the paper juxtaposed to these areas of the belt, and a grey tone will result.

Turning now to the left-hand portion of FIGS. 2 and 3, there is illustrated the situation if the facsimile signal represents "white." The intensity of the light beam 37' is now assumed to be such that the width of the strip which becomes paramagnetic during a scanning run of the beam is equal to the center-to-center line 2a distance of the scanning pattern, so that along sequential lines, such as identified by the traces 37d and 37e, no area remains in which the initial magnetization, as was provided by the magnet 42, is not destroyed. As a consequence, an area of the magnetic layer on belt 41 upon which lines are written developing intensities where the Curie point is exceeded over a width equal to the center-to-center distance between neighboring lines becomes completely remagnetized. Magnetic pole lines for exhibiting sufficient attraction toward the surface of the belt 41 are not set and magnetic toner particles will thus not be attracted to such an area.

For reasons of simplification, we have described the process involved in terms of line-for-line raster pattern with each line assumed to be written with a particular intensity of the light beam, but, of course, it will be appreciated that as a consequence of the scanning process on the transmitter side along each of the lines the intensity of the beam 37' will vary so that the line width of the written lines varies, and the magnetic pole lines will, therefore, not be straight lines any more, but will approach or recede in accordance with the light intensity which has exhibited by the demagnetizing beam.

The width spot. a strip which actually becomes paramagnetic depends not only upon the instantaneous intensity of the light beam but, of course, the controlling factor is the time integral of heat inflow and heat outflow for any given spot. The curves 37a, 37b, etc., are thus to be understood to define the total positive heat balance as effective at any increment in belt 41 along the scanning path of spot 37 for obtaining temperatures above or below the Curie point. Even though the temperature of any area heated by spot 37 drops immediately from any peak value after the spot 37 recedes, the maximum temperature obtained is controlling. If that maximum temperature reaches or exceeds the Curie point, then the area will be remagnetized.

In order to obtain a faithful reproduction the, what could be called operative flanks of the basic contour defining each of curves 37a, b, etc., should be as linear as possible. Such can be obtained through suitable light filtering, causing the light intensity across spot 37 to deviate from the normal Gaussian distribution. Alternatively, or additionally, the signal processor 35 can be provided as compensator to control the light intensity in response to the facsimile baseband signal along a nonlinear characteristics so that an essentially linear relationship is obtained between the width of the "written" strips, (such as 41a, 41b, etc.), and the grey tone scale values defining the facsimile baseband signal. One can readily see that this processing could also be carried out already on the transmitter side of the facsimile system.

For reasons of completion it should be mentioned that one can obtain a different relationship between signals as controlling the intensity of beam 37' and the raster pattern resulting therefrom. The control of the beam intensity could be in the inverse. Thus, a relative weak light intensity of beam 37' may correspond to a light or "white" image area, and a relatively strong intensity of beam 37' may represent a dark or "-black" image area. In this case, the light intensity of beam 37' is controlled along the raster lines as follows: For a light image area the beam's peak intensity does not or just barely suffice to render the magnetic layer of belt 41 paramagnetic. Trace 37x in FIG. 2 is representative of such intensity. For dark image areas the intensity is again as depicted by traces 37a and 37b. A light image area will thus be represented by relative wide or merging strips having retained the initial magnetization as provided by the transducer 42, while the situation depicted on the right-hand side of FIG. 2 and FIG. 3 then, again, represents the dark image area. The grey tone would then be represented by the relatively wide strips retaining the original magnetization.

FIG. 4 illustrates somewhat schematically equipment to be substituted for the magnet 42 in FIG. 1, for obtaining a somewhat different initial preparation of the magnetic storage carrier, prior to recording of the latent facsimile image by light beam 37a. There is provided a raster mask 60 defined by a constant-width line pattern of alternating opaque and transparent strips. These lines extend in the direction of propagation of belt 41. A pair of coils 61 and 62 is positioned respectively at opposite sides of the mask 60, which coils may, at times, be energized for magnetizing the magnetic layer in belt 41 in a particular manner. The coils are positioned to the sides of belt 41, propagating in FIG. 4 in direction normal to the plane of the drawing.

It is presumed that, as the belt 41 propagates and a portion of it positions itself underneath the mask 60, coils 61 and 62 provide first a rather strong magnetic field which magnetizes the storage carrier transverse to its direction of motion. As is symbolically indicated by the switch 63, the current to coils 61 and 62 generating the magnetic field which provides this saturation magnetization is reversed subsequently and an oppositely directed magnetic field is produced by coils 61 and 62. The reversed field, however, has below temperature coercivity and thus fails at that point to effect the magnetized storage carrier anywhere.

After reversal of the magnetic field a flashlight 65 is suitably triggered and illuminates the magnetic layer on belt 41 through the transparent lines of the mask 60, thus erasing the magnetization due to heating of the carrier above the Curie point in all those strips of the magnetic layer juxtaposed to the transparent lines of the mask 60. As the light flash decays the thus-affected portions of the tape of the belt 41 revert to the ferromagnetic state but now under the influence of the low-coercivity field applied by the coils 61 and 62.

As a consequence belt 41 leaves this premagnetizing station with a magnetic line pattern extending in the direction of propagation of the belt 41 and being defined by a large number of parallel strips of opposite-oriented transverse magnetization. Therefore, a line raster of magnetic pole lines is set up having direction parallel to the direction of belt movement. The pole lines are of alternating magnetic polarity and they are equidistantly spaced. The area of belt 41 thus affected is equal (or larger) to the size of the duplicate to be produced by the facsimile process. Accordingly, coils 61 and 62, as well as mask 60, have length (in direction normal the plane of the drawing of FIG. 4) equal to or larger than the "length" of the copy to be produced. It will be recalled, that length is defined in direction of belt movement. The raster as produced in this preparatory step, can have a very high resolution and exhibits maximum attraction to magnetic toner particles everywhere. Thus, without further measures an overall uniformly dark printout could be obtained from the thus-prepared magnetic layer.

The facsimile signal is now provided to the flying spot scanner 36 as aforedescribed and affects the magnetic storage carrier 41 in the same manner as aforedescribed, i.e., whatever magnetization exists along the travel path of spot 37 and over a width determined by the beam's intensity is destroyed. However, the principal recording process obtained now is the erasure itself. The facsimile beam erases the magnetic poles along a variable-width line pattern. Wherever such erasure occurs no particles will be attracted any more. However, the low-coercivity field is still provided here by transducer or magnet 43, concurrently with the recording. The function of that field is somewhat different in this case. It provides the portions affected by the facsimile printout beam 37' with a magnetization having an axis transverse to either of the two magnetizations provided in the preparing station, as shown in FIG. 4. This magnetization serves as a buffer, i.e., it is provided to prevent those areas in which the magnetization has been erased from being remagnetized in accordance with the initial bias. If such buffer magnetization were not provided the neighboring regions in which such erasure did not take place could remagnetize the demagnetized areas in accordance with the initial magnetization pattern and thus destroy the latent image. The buffer magnetization provided by magnet 43 in this case prevents this remagnetization.

A representative area of the magnetic layer of belt 41 after leaving the facsimile record station is shown in FIG. 5. The areas 71, for example, show a magnetization as it was initially provided by the coils 61 and 62 when uniformly magnetizing the portion of the magnetic layer on belt 41 within their range. The areas 72 are the remnants of those lines magnetized by the coils 61 and 62 during and after the flash from the light 65. The borders between areas 71 and 72 are magnetic pole lines oriented normal to the surface of belt 41. Areas 71 and 72 together provide, therefore, the initial raster magnetization.

The variable-width strips 73 resulted from the beam 37', the principal function of which was the erasure of some of the initially set up magnetic poles along the borderlines between neighboring strips 71 and 72. The beam's intensity is controlled from the facsimile signal in, what was mentioned above, the inverse mode. Facsimile signals representing bright document-image areas provide minimum intensity of beam 37' so that just the peak of the resulting energy distribution may barely penetrate the Curie level, (**37*x* in FIG. 2). Facsimile signals representing dark document-image areas provide an intensity depicted as trace 37*a* or 37*b* in FIG. 2**.

A facsimile printout station equipped with the device as shown in FIG. 4 is somewhat more involved, but the printout is basically independent from the resolution of the line scanning of the facsimile process. The formation of high and low-density magnetic pole areas is entirely independent from the raster of the facsimile scanning process itself. However, a simpler system of the type aforedescribed with reference to FIG. 1 was found to be sufficient for most cases.

It should be noted, that the facsimile system was described above for one way transmission. In actuality, facsimile systems often have transmission and receiving facilities in the same unit or station to selectively operate as facsimile transmitter or as facsimile receiver. The system, as described, permits an important simplification. As to transmission, a transducer system 20 was described using a flying spot scanner, i.e., a movable, focused light beam, the reflection of which is photoelectrically detected. As to reception, there is also a flying spot scanner 36 because the reproduction process likewise uses a focused light beam. Hence, the same scanning and beam producing system can be used for pickup illumination and scanning and for controlling production of a latent magnetic image. Belt 41 could then be substituted by a regular flexible conveyor belt for holding a document when scanner 36 is to operate as illuminator for a photoelectric transducer 60 driving a transmitter 61 incorporating circuit elements such as 22, 23, 26 and 24. Employment of a nonmagnetic conveyor belt, when the unit is used as transmitter, is advisable in order to protect the magnetic layer of the belt 41 to be used as magnetic image carrier only during receiving and not as a transport means, though that is conceivable.

The endless belt may be a nonmagnetizable transport belt, and individual foils or sheets are placed upon it: a document when the unit operates as facsimile pickup unit, and a magnetizable foil or sheet when the unit operates as facsimile storage and reproduction unit. When operating a facsimile pickup, toner tank 44 must, of course, be removed. Document and magnetizable sheet support can also be constructed as disclosed in the above-defined patent applications, supplemented by magnet means for providing the substitute magnetization as was described above with reference to the function of transducer 43. The premagnetization of a magnetizable sheet can, but does not have to be provided in the station itself; instead, one can use appropriately premagnetized foils or sheets. A strong magnet manually swept over such a sheet can readily be employed to magnetize such a sheet as does magnet 42 in the automated system as described. The magnetic bias pattern, as described above with reference to FIGS. 4 and 5, can actually be produced also by means of the radiation record station as employing scanner 36 and magnet 43. The magnetizable sheet is turned by 90° in relation to its position for facsimile recording; the sheet is uniformly magnetized and then sent through the station with the intensity of beam 37' being adjusted as was described above for producing a dark image. This way, the magnetizable foil or sheet is prepared in the station, of course, at times when the latter is not used for facsimile transmission or reception. For facsimile reception and recording the sheet is then sent again through the range of beam 37' but now at such an orientation that spot 37 runs orthogonally to the previously established line pattern.

The invention is not limited to the embodiments described above but all changes and modifications thereof not constituting departures from the spirit and scope of the invention are intended to be covered by the following claims.

What is claimed is:

1. In a facsimile system using a medium having a magnetizable surface to reproduce facsimile information on a document;

first means for providing at a first position facsimile signals including means for raster scanning the document in a line-for-line scanning pattern;

second means coupled to the first means for transmitting the facsimile signals to a position remote from the first position;

third means for providing on the magnetizable surface of the magnetizable medium a substantially uniform distribution of magnetic poles having characteristics of attracting magnetizable particles towards the poles of said magnetizable surface;

fourth means responsive to the transmitted facsimile signals to obtain a variation in the magnetizable medium in the distribution of magnetic poles in accordance with the characteristics of the facsimile signals to produce a latent magnetic image of the document represented by a spatially variable distribution of magnetic pole strength on a per-unit basis in accordance with the characteristics of the facsimile signals; and fifth means for producing an image representative of the latent magnetic image in accordance with the distribution of the magnetic poles.

2. In a facsimile receiver for providing an image on a magnetizable medium in accordance with line-for-line scanning signals representing facsimile information where the medium has an exposed surface and temperature-dependent ferromagnetic and paramagnetic states:

first means for receiving the line-for-line scanning signals representing the facsimile information;

second means for providing a focused beam of radiant energy;

third means connected to said first means for controlling the intensity of the focused beam in response to the characteristics of the line-for-line scanning signals;

fourth means for providing relative motion between the beam and the magnetizable medium;

fifth means for producing a particular magnetization in a first direction of the exposed surface of the medium;

sixth means for obtaining a line-for-line scanning raster resulting from interaction of the radiant energy of the beam as controlled by the third means and the exposed surface of the medium so that the areas of the carrier along the lines of the raster become temporarily paramagnetic and revert subsequently to the ferromagnetic state;

seventh means for magnetizing the medium with a magnetization different from the particular magnetization, prior to completion of reversion to the ferromagnetic state so that, subsequent to the reversion, the medium provides magnetic attraction having a variable intensity along the lines of the raster in accordance with the intensity of the focused beam;

eighth means for applying magnetizable toner particles to the carrier for adherence to the carrier in accordance with the variable magnetic attraction along the lines of the raster; and ninth means juxtapositioning a contrast-producing material to the carrier to which the toner particles have been applied so as to provide a printout.

3. A facsimile receiver as set forth in claim 2:

the fifth means being constructed to magnetize the medium prior to interaction with the beam, the beam having a variable intensity for erasing the magnetization along the lines of the raster strip over a strip having a variable intensity in accordance with the variable intensity of the beam, the strips being temporarily rendered paramagnetic; and the seventh means being constructed to magnetize the medium with a coercivity field, below that required to magnetize the medium at room temperature, during the reversion from the paramagnetic to the ferromagnetic states and at a field orientation transverse to the first direction so that the magnetization in the strips as magnetized by the seventh means differs from the magnetization provided by the fourth means initially in these strips.

4. In a facsimile receiver as set forth in claim 2, the third means including means for operating the third means as a line scanner, the fourth means including means coupled to the magnetizable medium for driving the medium in a direction substantially perpendicular to the line scan of the line scanner for obtaining the raster.

5. In a facsimile receiver in accordance with claim 2, the fifth means being constructed to provide the particular magnetization in a first direction on the medium and the seventh means being constructed to magnetize the medium in a second direction transverse to the first direction.

6. In a facsimile system for producing duplicates of documents at a location remote from the location of the document and at a time wherein a magnetizable medium is used to produce the duplicates and is provided with an exposed surface and with ferromagnetic and paramagnetic states dependent upon the temperature of the medium:

transducer means at the location of the document for providing a line-for-line raster scanning of the document to produce electrical line scan signals representative of the characteristics of the document;

first means connected to the transducer means for transmitting said line scan signals as facsimile signals to the remote location;

second means disposed at the remote location for receiving said transmitted facsimile signals;

third means connected to the second means and responsive to the received signals for providing a beam of radiant energy;

fourth means for providing a line-for-line scan of the beam corresponding to the line-for-line scan of said transducer means;

fifth means disposed prior to the beam for producing particular magnetization on the medium;

sixth means for modulating the beam in accordance with the characteristics of the received signals to provide the beam with intensities to cause progressive areas of the medium along the lines of the scan to become temporarily paramagnetic and to revert subsequently to the ferromagnetic state, the progressive areas being variable in accordance with the characteristics of the received signals;

seventh means operable on the magnetizable medium prior to completion of reversion to the ferromagnetic state to magnetize the medium in a second direction transverse to the first direction so that the medium provides a magnetic attraction having an intensity variable along the lines of the raster in accordance with the variations in the intensity of the beam and defining a latent magnetic image of the document scanned by the transducer means.

7. In facsimile apparatus as set forth in claim 6, the fourth means being constructed to produce the magnetization in a first direction transverse to the line scan, the sixth means being operable to magnetize the medium in the first direction, and means being provided for obtaining a movement of the beam relative to the medium in the first direction.

8. In a facsimile apparatus as set forth in claim 6, the fourth means being constructed to produce the magnetization in a first direction transverse to the line scan, the sixth means being operable to magnetize the medium in a second direction transverse to the first direction and substantially corresponding to the line scan.

9. In a facsimile receiver using a magnetizable medium having a magnetizable surface to reproduce the facsimile information where the medium has an exposed surface and temperature-dependent ferromagnetic and paramagnetic states, means for receiving signals representing facsimile information and providing facsimile signals representative thereof;

means for providing to the medium a line pattern of magnetic poles defined by substantially equally spaced, substantially parallel pole lines of alternating opposite polarities;

means responsive to the facsimile signals for providing a beam having a variable intensity in accordance with variations in the characteristics of the facsimile signals;

means responsive to the beam of variable intensity for providing a line spacing of the magnetic poles locally variable between a substantially equidistant spacing of neighboring lines and at least an approximate merger of pairs of neighboring lines in accordance with variations in the intensity of the beam; and means responsive to the line spacings between magnetic poles for providing an image having variable shades of lightness and darkness in accordance with the variable spacing of the lines.

10. In a facsimile receiver and printout device utilizing a magnetizable medium having a magnetizable surface to reproduce the facsimile information where the medium has an exposed surface and temperature-dependent ferromagnetic and paramagnetic states:

means for receiving signals representative of facsimile information and providing facsimile signals representative of such facsimile information;

means for providing a line pattern of magnetic poles defined by substantially equally spaced, substantially parallel pole lines of alternating opposite polarities and an equal distribution of centers between the pole lines;

means responsive to the facsimile signals for providing a beam having a variable intensity in accordance with variations in the characteristics of the facsimile signals;

means responsive to variations in the intensity of the beam for providing variations in the distribution of said centers in said storage carrier in accordance with such variations, the centers exhibiting the attraction of toner particles towards the centers transverse to the surface of the carrier as well as along the surface of the carrier towards the poles; and means responsive to the variations in the distributions of the centers for producing an image having variations in light and dark intensity in accordance with the variations in the distributions of the centers.

11. In a facsimile system where a magnetizable medium is provided with ferromagnetic properties at temperatures below a critical value and with paramagnetic properties at temperatures above the critical value:

first means for providing facsimile signals having characteristics representing the facsimile information;

second means for providing a beam of energy;

third means responsive to the facsimile signals for modulating the beam of energy in accordance with the characteristics of the facsimile signals;

fourth means for producing on the magnetizable medium a particular magnetization;

fifth means for producing a movement of the magnetizable medium in a particular direction past the beam of energy;

sixth means responsive to the modulated beam of energy for directing the beam to the magnetizable medium, after the production of the particular magnetization on the magnetizable medium, to obtain temperatures above the critical temperature on the magnetizable medium in areas dependent upon the modulation of the beam; and seventh means responsive to the production of temperatures above the particular temperatures in the different areas of the magnetizable medium for producing a magnetization on the magnetizable medium different from the first particular magnetization.

12. In a facsimile system as set forth in claim 11, means for applying a magnetic toner to the magnetizable medium after the operation of the seventh means on the medium to prepare the medium for a printing of the facsimile image; and means responsive to the application of the magnetic toner to the magnetizable medium for printing a copy of the facsimile image.

13. In a facsimile system as set forth in claim 11, the fourth means being constructed to produce substantially parallel, substantially equally spaced poles on the magnetizable medium and the seventh means being constructed to produce unequal separation in such poles in accordance with the modulations in the beam of energy.

14. In the facsimile system set forth in claim 13, the fourth means being constructed to produce the substantially equal spacing of the poles in a first direction, and the seventh means being constructed to produce unequal separation between the poles in the first direction in accordance with the modulations in the beam of energy, and means being provided to produce a movement of the medium relative to the beam in the first direction.

15. In a facsimile system as set forth in claim 11, the fourth means being constructed to produce a magnetization in a first direction on the magnetizable medium and the seventh means being constructed to produce magnetization in a second direction substantially perpendicular to the first direction and in areas dependent upon the modulations in the beam of energy.

16. In facsimile apparatus as set forth in claim 15, eighth means for applying magnetizable toner particles to the magnetizable medium after the operation of the seventh means on the magnetizable medium; and ninth means operable after the application of the magnetizable toner particles to the magnetizable medium for obtaining a printout of the latent image on the magnetizable medium.

17. In a facsimile system for reproducing a facsimile image from a document where a magnetizable medium is provided with ferromagnetic properties at temperatures below a critical value and with paramagnetic properties at temperatures above the critical value;

first means at a first position for scanning the document in transverse lines on the document to produce facsimile signals having characteristics dependent upon the characteristics of the document at the position being scanned;

second means at the first position for providing a movement of the document relative to the first means in a longitudinal direction;

third means at the first position for transmitting the facsimile signals to a second position removed from the first position;

fourth means at the second position for providing a particular magnetization on the magnetizable medium;

fifth means at the second position for providing a beam of energy;

sixth means at the second position for modulating the beam of energy in accordance with the characteristics of the facsimile signals;

seventh means at the second position for directing the modulated beam of energy in transverse lines on the document in accordance with the scanning of the document in transverse lines by the first means to obtain the production of a temperature above the critical temperature in variable areas dependent upon the modulations of the beam;

eighth means at the second position for providing a movement of the medium relative to the seventh means in the longitudinal direction; and ninth means at the second position and responsive to the production of a temperature above the critical temperature in the variable areas for magnetizing the magnetizable medium with a second magnetization different from the particular magnetization in such variable areas.

18. In a facsimile system as set forth in claim 17:

the fourth means being constructed to provide the particular magnetization in a first direction on the magnetizable medium and the ninth means being constructed to magnetize the magnetizable medium in a second direction substantially perpendicular to the first direction.

19. In a facsimile system as set forth in claim 17:

the fourth means being constructed to provide substantially equally spaced, substantially parallel poles on the magnetizable medium and the ninth means being constructed to magnetize the magnetizable medium to separate the spacings between poles in accordance with the variations in the areas of the modulated beam.